United States Patent

Itakura et al.

[11] Patent Number: 5,978,332
[45] Date of Patent: Nov. 2, 1999

[54] OPTICAL RECORDING MEDIUM, TILT DETECTOR, OPTICAL DISK DRIVE, TILT DETECTING METHOD, AND TILT CORRECTING METHOD

[75] Inventors: Akihiro Itakura; Michio Matsuura, both of Kawasaki, Japan

[73] Assignee: Fujitsu Limited, Kawasaki, Japan

[21] Appl. No.: 08/949,121

[22] Filed: Oct. 10, 1997

[30] Foreign Application Priority Data

Apr. 24, 1997 [JP] Japan ................................ 9-107923

[51] Int. Cl.$^6$ ................................ G11B 7/00; G11B 3/70
[52] U.S. Cl. ................................ 369/44.32; 369/275.4
[58] Field of Search ................................ 369/44.14, 44.25, 369/44.26, 44.32, 44.33, 44.41, 44.42, 47, 50, 53, 54, 58, 116, 120, 275.4

[56] References Cited

U.S. PATENT DOCUMENTS

| | | | |
|---|---|---|---|
| 5,206,848 | 4/1993 | Kusano et al. | 369/44.41 |
| 5,430,699 | 7/1995 | Matsubara et al. | 369/44.32 |
| 5,523,989 | 6/1996 | Ishibashi | 369/44.32 |
| 5,627,808 | 5/1997 | Hajjar et al. | 369/44.32 |
| 5,696,756 | 12/1997 | Fujimoto et al. | 369/275.4 |
| 5,808,985 | 9/1998 | Gerber et al. | 369/44.32 |
| 5,886,962 | 3/1999 | Takamine et al. | 369/44.32 |

*Primary Examiner*—Paul W. Huber
*Attorney, Agent, or Firm*—Greer, Burns & Crain

[57] ABSTRACT

A tilt detector and tilt detecting method of detecting a tilt amount by using a tracking error signal, for example, a push-pull signal, obtained from the difference in quantities of light received by a photo detector halved in a direction vertical to the track direction, and correcting an error of tilt amount detected by the imbalance of the light beam on the mirror surface.

An optical recording medium for emphasizing the asymmetricity to the track center of the tracking error signal by changing a spatial frequency in the direction vertical to the track at a specified portion to the spatial frequency in the direction vertical to the track at another portion.

An optical disk drive and tilt correcting method including the steps of calculating an off-track amount which is proportional to a tilt amount detected by a tilt detector, giving the off-track calculated by the off-track calculating means to an optical recording medium by an actuator, and maintaining the center of the light beam intensity at the track center.

15 Claims, 21 Drawing Sheets

PARTIALLY CHANGE A TRACK PITCH

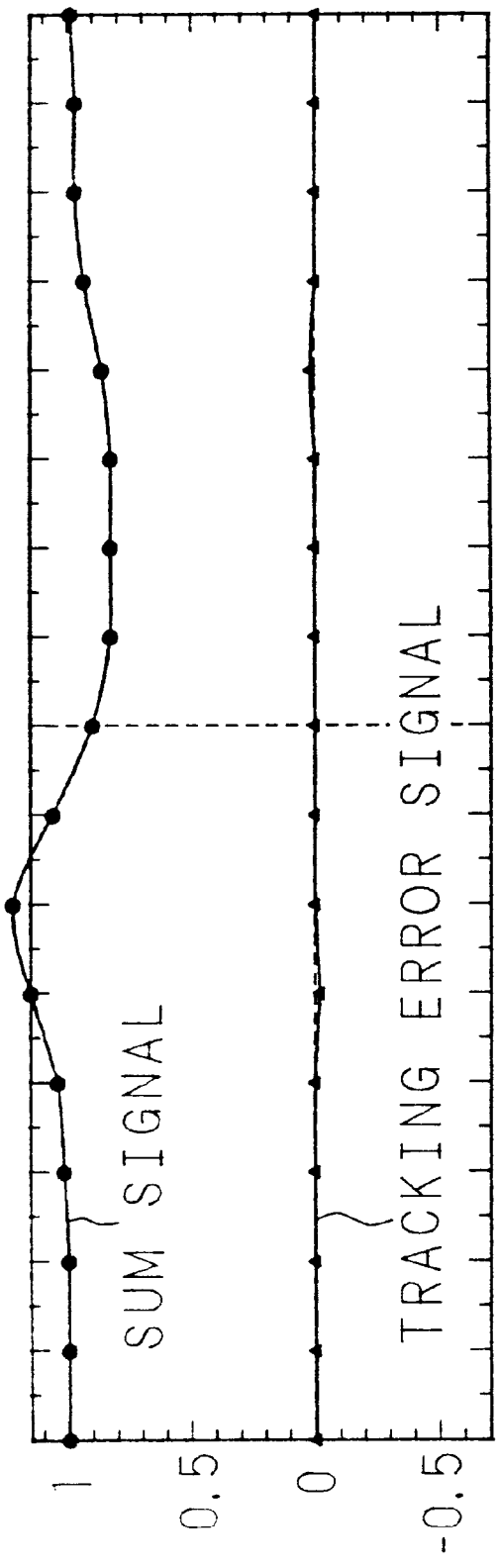

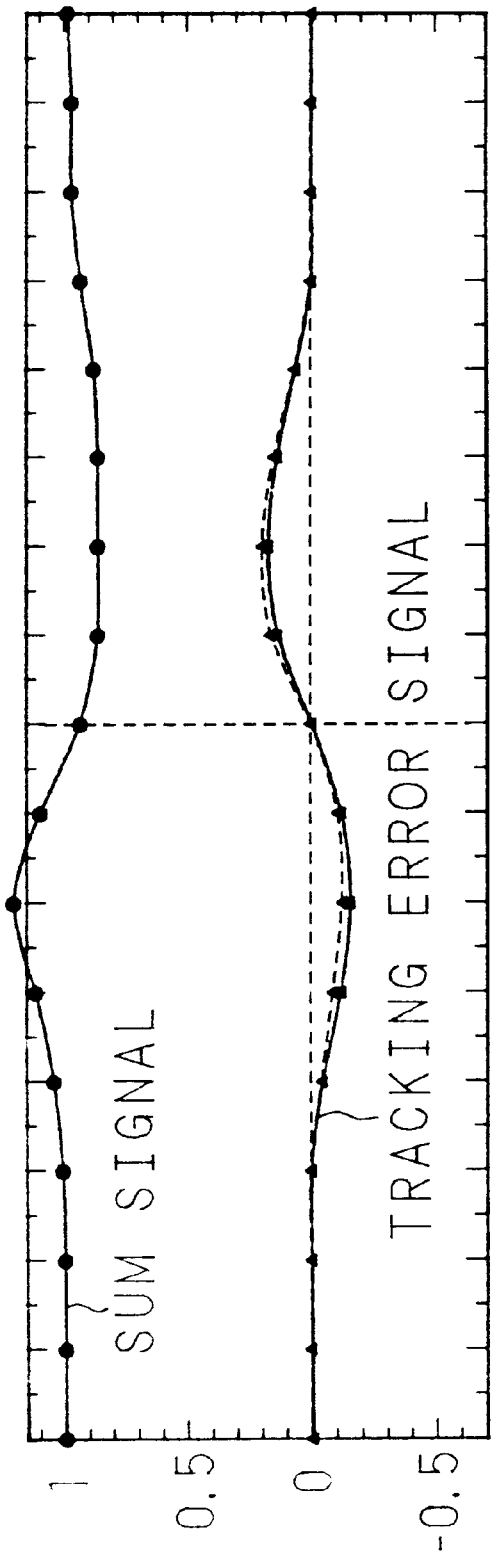

OPTICAL RECORDING MEDIUM, TILT DETECTOR, OPTICAL DISK DRIVE, TILT DETECTING METHOD, AND TILT CORRECTING METHOD

BACKGROUND OF THE INVENTION

The present invention relates to an optical recording medium such as an optical disk and a magneto-optical disk capable of recording information in each track formed by a land and a groove provided between the lands, a tilt detector of optical recording medium, an optical disk drive, and a tilt detecting method and tilt correcting method of optical recording medium.

Optical disks include, aside from a read-only optical disk such as a CD-ROM, a direct read after write optical disk capable of recording additionally, a rewritable magneto-optical disk, and a phase change type disk, among others, and larger capacity and higher density are demanded recently along with the progress of the electronic society.

To increase the memory capacity of an optical disk, it has been attempted to shorten the wavelength of the laser beam used for the light beam, and to increase the numerical aperture (NA) of the lens used in the emission of the light beam and the reception of its reflected light. As a result, however, the tolerance for tilt (inclination of an optical disk) has now been narrowed.

In conventional measures for detecting tilt, the light beam was emitted to the optical disk, the tilt amount of the optical disk was detected from the difference in the quantities of light received by two photo sensors mounted on the periphery of the emission lens, and the lens, actuator, entire carriage or the spindle itself was inclined depending on the detection signal, thereby decreasing the tilt amount.

This method was applied, however, only in the optical disk drives not requiring high speed access, such as video discs, and since the mechanism itself is inclined, the response time is slow, and it could not be applied in optical disk drive requiring a high speed access, such as those used in computers.

BRIEF SUMMARY OF THE INVENTION

The present invention is devised in the light of such background, and it is hence an object thereof to present an optical recording medium, a tilt detector, and a tilt detecting method, not requiring a complicated tilt detecting mechanism, and capable of expanding the tolerance for the tilt in the short wavelength laser and high NA lens, and increasing the memory capacity of the optical disk drive.

It is another object to present an optical disk drive and a tilt correcting method, not requiring a complicated tilt correcting mechanism, and that has a quick response time.

A tilt detector and a tilt detecting method according to the present invention are characterized by detecting the tilt amount by using a tracking error signal, for example, a push-pull signal, obtained from the difference in the quantities of light received by a photo detector halved in the direction vertical to the track direction.

An optical recording medium according to the present invention is characterized by emphasizing the asymmetricity of a tracking signal with a tilt to the track center, by changing the spatial frequency (the number of repeated shapes included in a specific distance; corresponding to the frequency which is the number of waves included in a specific time) in a direction vertical to the track direction at a specified portion to the spatial frequency in a direction vertical to the track direction at another portion.

In a tilt detector and a tilt detecting method according to another aspect of the present invention, the mirror surface reflects completely, not generating the first-order diffracted light, and generates no (or little) difference signal, and hence it cannot be used in detection of the tilt amount, but since the imbalance of the light beam can be detected as the difference in the quantities of the light received by the photo detector, and by making use of this nature, in the presence of the imbalance of the light beam, the zero-order diffraction light is asymmetric, and a slight error in the tilt amount detection occurs, so that the error in the tilt amount detection can be corrected by the imbalance of the light beam detected on the mirror surface.

In an optical disk drive and a tilt correcting method according to the present invention, an off-track proportional to the tilt amount detected by the tilt detector is calculated, the actuator gives the off-track calculated by the off-track calculating means to the optical recording medium to maintain the center of intensity of the light beam in the track center.

The above and further objects and features of the invention will more fully be apparent from the following detailed description with the accompanying drawings.

BRIEF DESCRIPTION OF THE SEVERAL VIEWS OF THE DRAWINGS

FIG. 12 is a graph showing a tracking error signal by the simulation;

FIG. 15 is a graph showing a tracking error signal by the simulation;

DETAILED DESCRIPTION OF THE INVENTION

Figure 1:
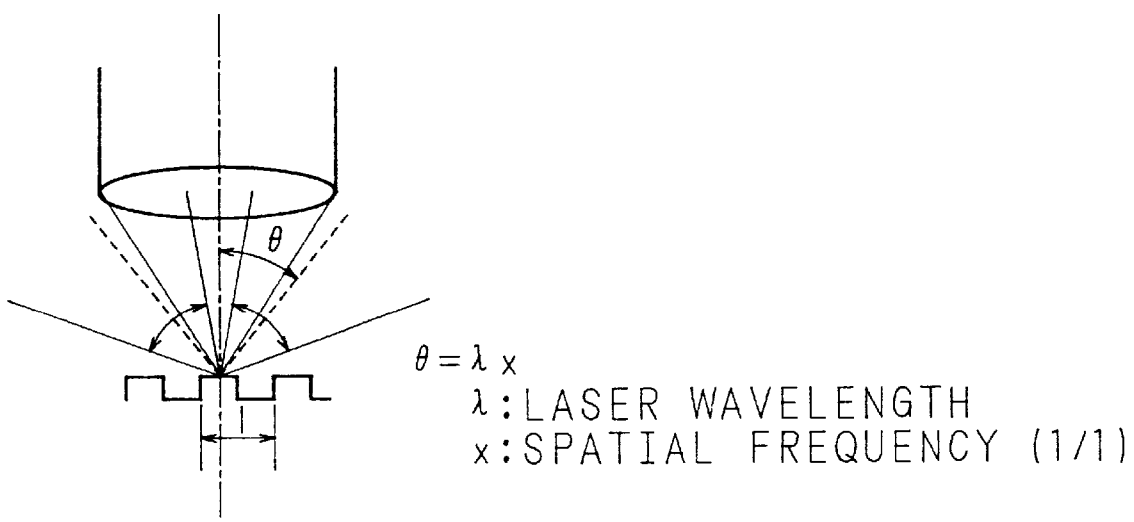
FIG. 1 is a drawing for explaining the first-order diffracted light of the emitted light beam, generated by a groove.

A push-pull signal is as shown in FIG. 1, in which tracking position information is obtained by the degree of interference of the emitted light beam with the first-order diffracted light generated by the groove.

Figure 2B:
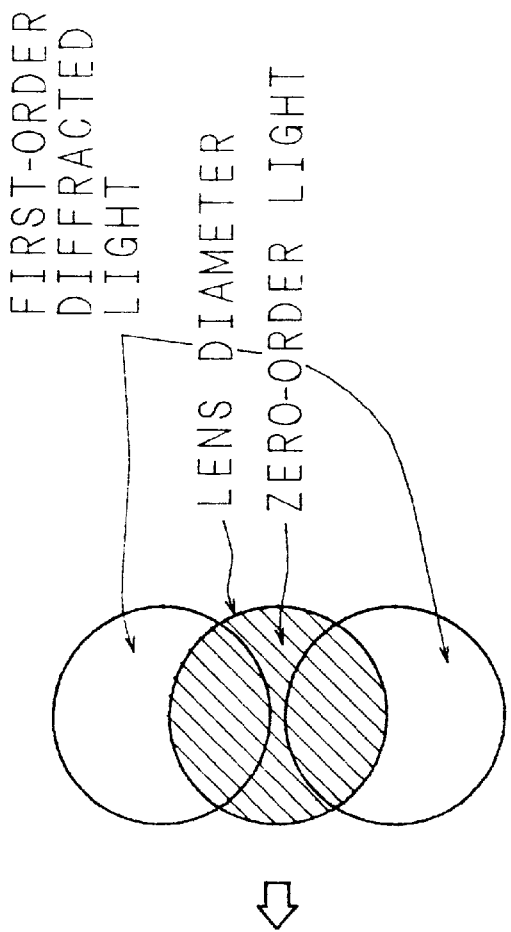
FIG. 2A and 2B are drawings for explaining the zero-order light and the first-order diffracted light of the light beam when the tracking position is correct.
Figure 2A:
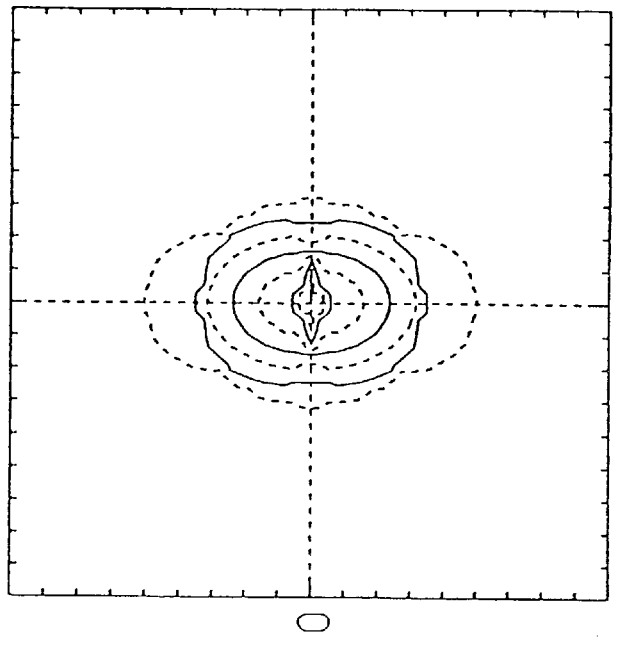
Figure 3A:
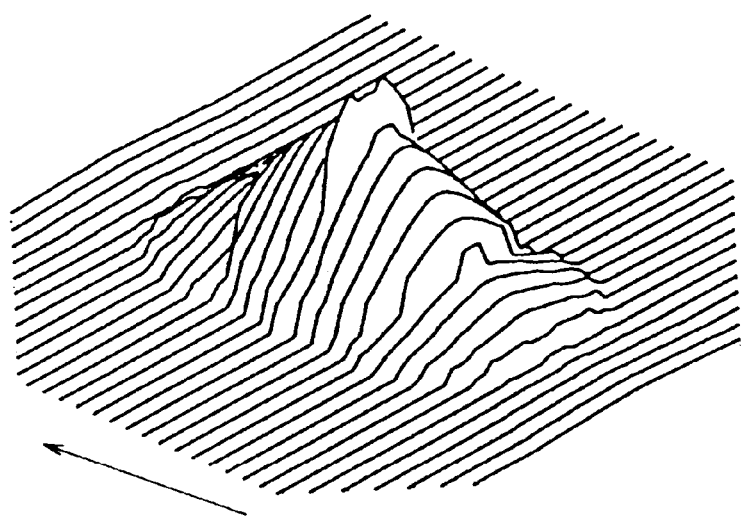
FIG. 3A and 3B are drawings for explaining the zero-order light and the first-order diffracted light of the light beam when the tracking position is correct.
Figure 3B:
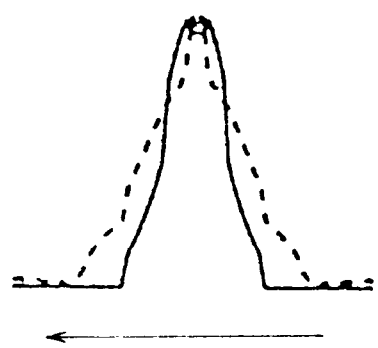

FIG. 2B is a plan view of the zero-order light of the light beam when the tracking position is correct, and the first-order diffracted light generated on the right and left side of the track center. FIG. 2A is a top view of their intensity, in which the horizontal line 0 corresponds to the track center. FIG. 3A is a solid view of FIG. 2A, and FIG. 3B is a central sectional view taken along an arrow in the direction vertical to the track of FIG. 3A. In FIG. 2A and FIG. 3B, the solid line denotes the zero-order light, and the broken line indicates the first-order diffracted light.

Figure 4A:
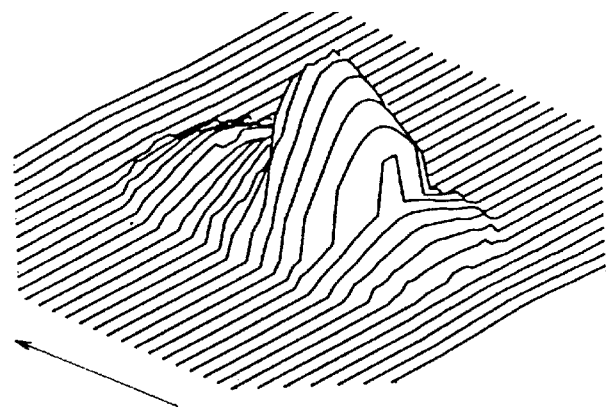
FIG. 4A to 4C are drawings for explaining the zero-order light and the first-order diffracted light of the light beam when the tracking position deviates.
Figure 4B:
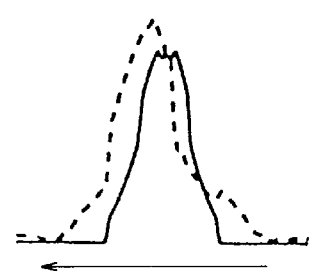
Figure 4C:
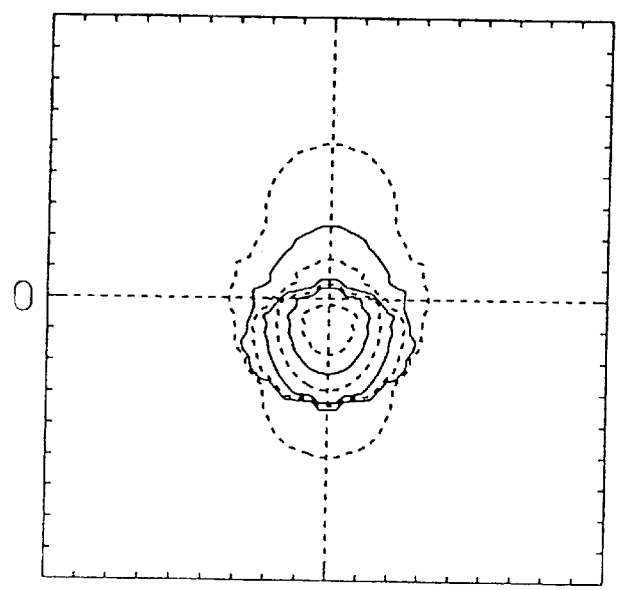

When the tracking position deviates, as shown in FIG. 4, the first-order diffracted light becomes out of balance, and its difference appears as a tracking error signal. FIG. 4A is a solid view of the intensity of the zero-order light and first-order diffracted light, and FIG. 4B is a central sectional view taken along an arrow in the direction vertical to the track of FIG. 4A. FIG. 4C is a top view of FIG. 4A, in which the horizontal line 0 corresponds to the track center.

Figure 5A:
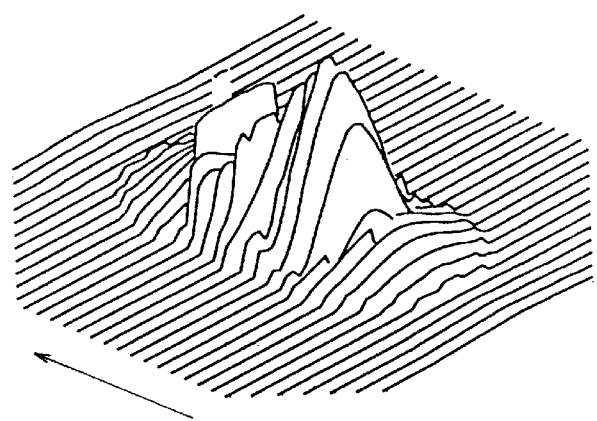
FIG. 5A to 5C are drawings for explaining the zero-order light and the first-order diffracted light of the light beam with no off-track but with tilt.
Figure 5B:
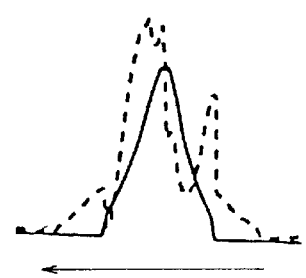
Figure 5C:
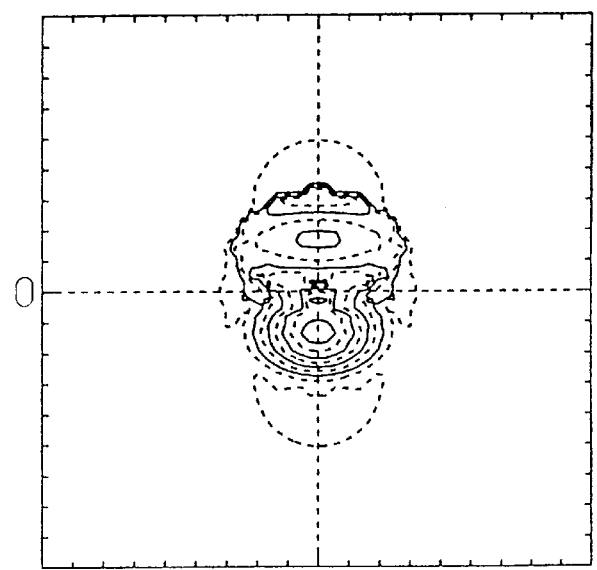

When the off-track is zero but the tilt amount is not zero, as shown in FIG. 5, the first-order diffracted light becomes slightly out of balance, but the tracking error signal changes slightly. The explanation about FIGS. 5A, 5B, 5C is same as in FIGS. 4A, 4B, 4C. It was difficult to detect this slight change of the tracking signal precisely because of surface irregularity by molding of the optical recording medium, etc.

Figure 6A:
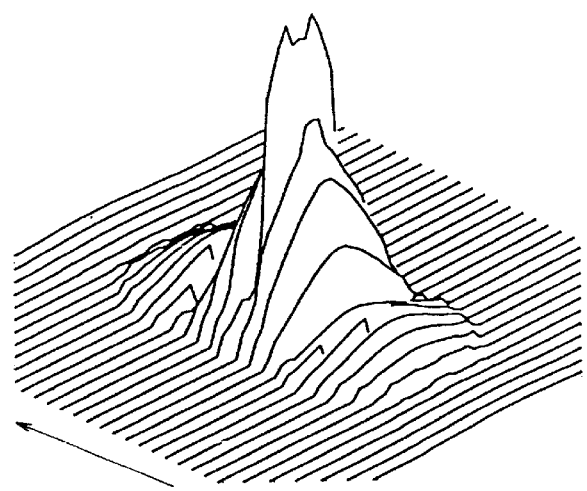
FIG. 6A to 6C are drawing for explaining the zero-order light and the first-order diffracted light of the light beam when defocusing.
Figure 6B:
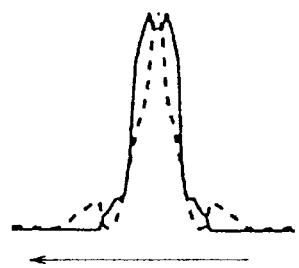
Figure 6C:
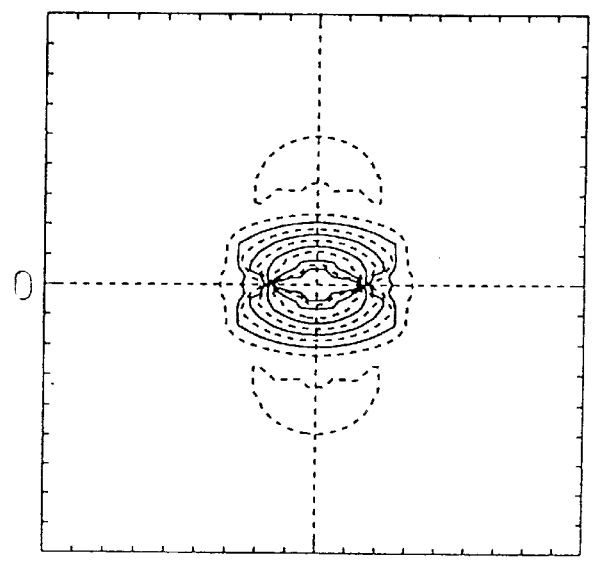
Figure 7A:
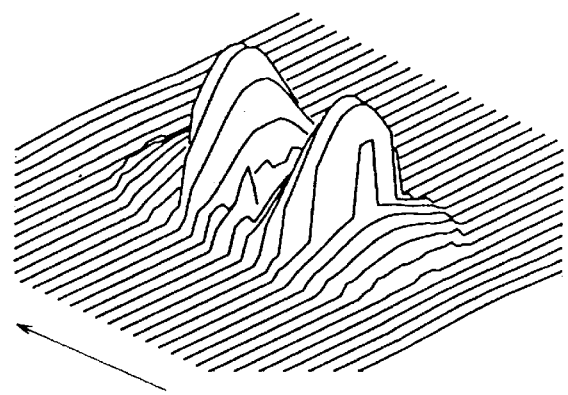
FIG. 7A to 7C are drawings for explaining the zero-order light and the first-order diffracted light of the light beam when defocusing.
Figure 7B:
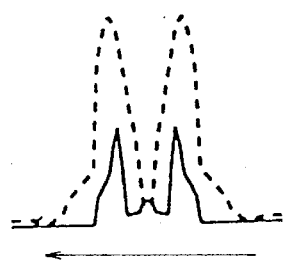
Figure 7C:
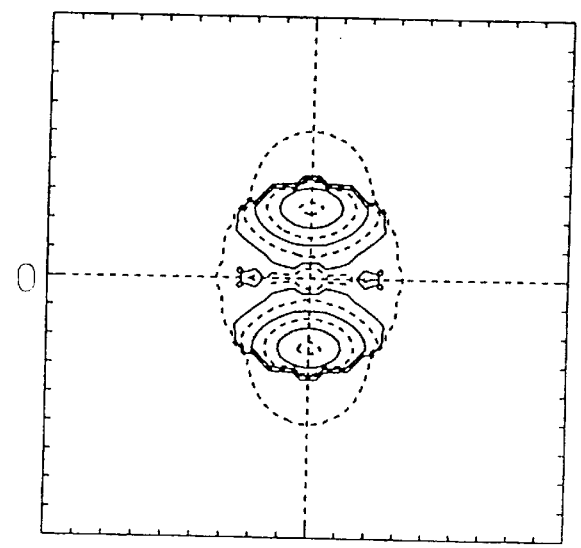

FIGS. 6 and 7 are solid views of the intensity of the zero-order light and first-order diffracted light when defocusing, and the zero-order light and first-order diffracted light are balanced respectively. The explanation about FIGS. 6A, 6B, 6C and FIGS. 7A, 7B, 7C is the same as in FIGS. 4A, 4B, 4C.

Herein, mutually comparing FIG. 2, FIG. 3, FIG. 5, FIG. 6, and FIG. 7, only when the tilt amount is not zero (FIG. 5), the intensity of the zero-order light and first-order diffracted light is asymmetrical to the center of the track.

That is, by detecting the change that occurs only when the diffraction pattern (the intensity distribution of the zero-order light and first-order diffracted light) is asymmetrical, the tilt amount can be detected. At this time, however, the off-track is taken as zero because it is almost always detected and corrected.

One of the methods for obtaining the diffraction pattern of large asymmetricity for the ease of detection is to change the spatial frequency of the grooves or lands.

When the spatial frequency changes, the diffraction angle of the first-order diffracted light varies, and hence the mutual interference of diffraction patterns changes. Since aberrations due to causes other than tilt are line symmetrical to the track center, if the diffraction angle of the first-order diffracted light changes, the difference does not change (i.e., a tracking error does not occur). Only in the case due to tilt is a differential signal generated due to interference with the diffraction pattern of the zero-order light, and hence it is detected.

A tracking servo circuit of an optical disk drive operates to always make the tracking error signal to be zero so that, by forming a portion different in spatial frequency, the tilt amount is detected from the differential signal generated in this portion.

Figure 8:
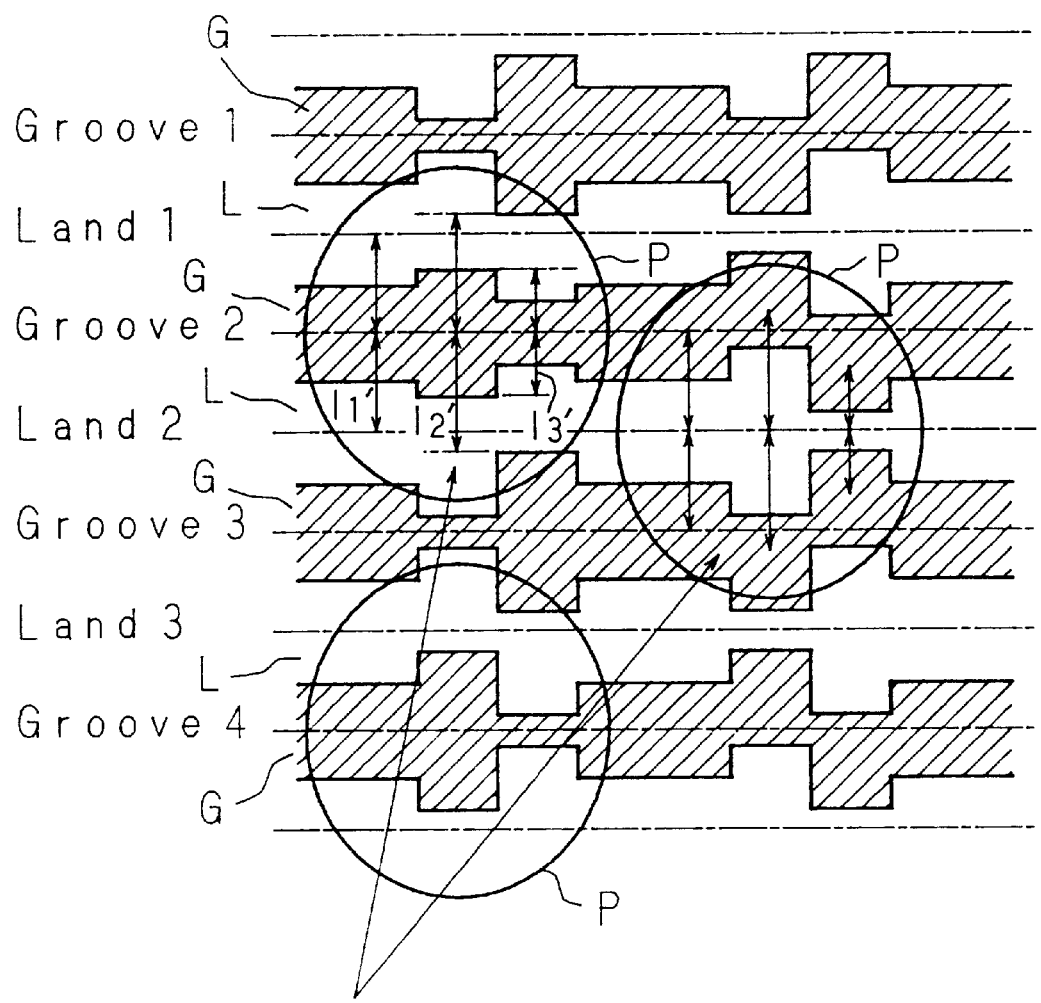
FIG. 8 is a drawing for explaining a pattern of grooves and lands in an optical recording medium of the invention.

FIG. 8 is an example of a pattern of grooves and lands of such an optical recording medium. It is insufficient to only change the groove and land in width to vary the spatial frequency. It is necessary to change the track pitch by displacing the centers of the grooves and the lands. Accordingly, a tilt detection portion P is provided, for instance, where track pitches $l_1$, $l_2$, $l_3$ between a groove a 2 and both adjacent land 1 and land 2 are varied. Consequently, a tracking error signal is output from the tracking error detecting circuit 12 (shown in FIG. 19) under the influence of the both land 1 and land 2 adjacent to the groove 2 when the laser beam scans over the groove 2 of the tilting recording medium. The spatial frequency is changed only at both sides of a running track, but it is enough because the irradiation range of the laser spot is narrow.

Figure 9:
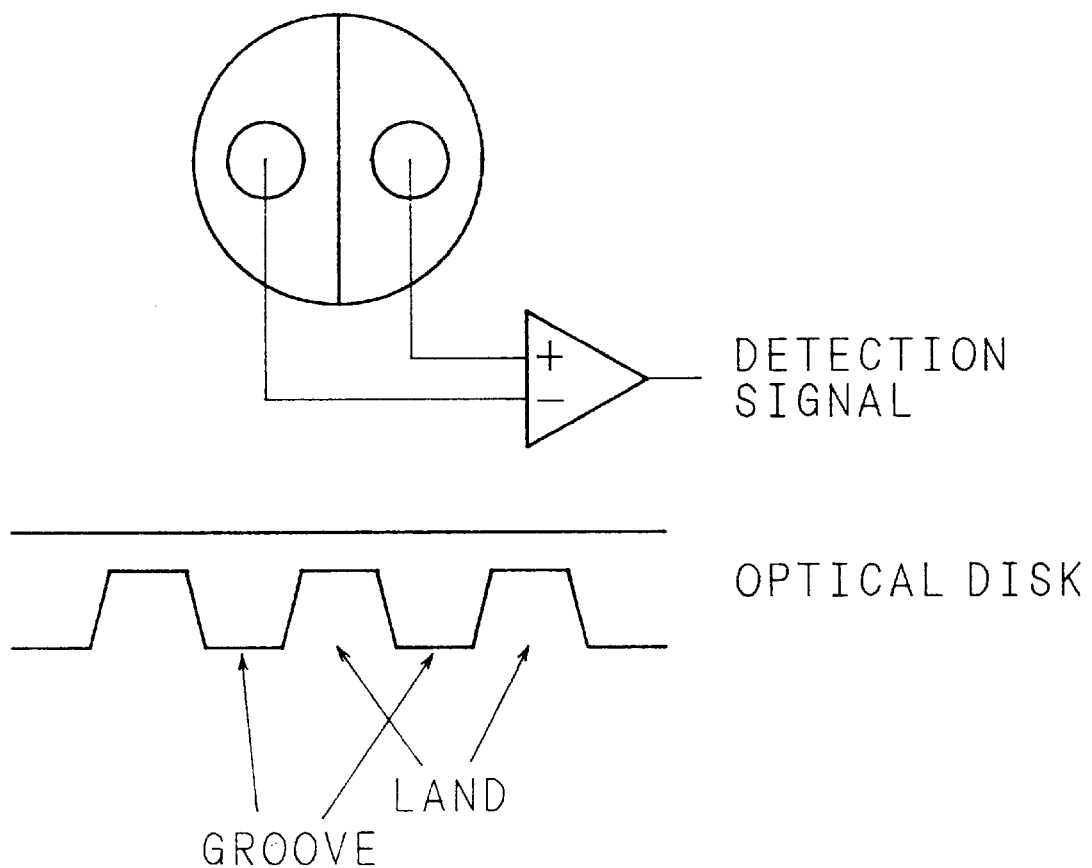
FIG. 9 is a drawing for explaining an optical detector halved in a direction vertical to the track direction.

By making use of the nature that the diffraction pattern is asymmetrical when the tilt amount is not zero, it is intended to detect the difference in the quantities of the light received by the tracking error detector at the portion P for tilt detection for obtaining a tracking error signal (for example, a push-pull signal) from the difference in the quantities of the light received by the photo detector halved in a direction vertical to the track direction as shown in FIG. 9. As in the figure, the photo detector is arranged to make the halved line parallel with the track direction so that the two halved portions are positioned in the direction vertical to the track direction. In this case, aberrations due to aspects other than tilt do not occur because it is line symmetrical to the center of the track.

Figure 18:
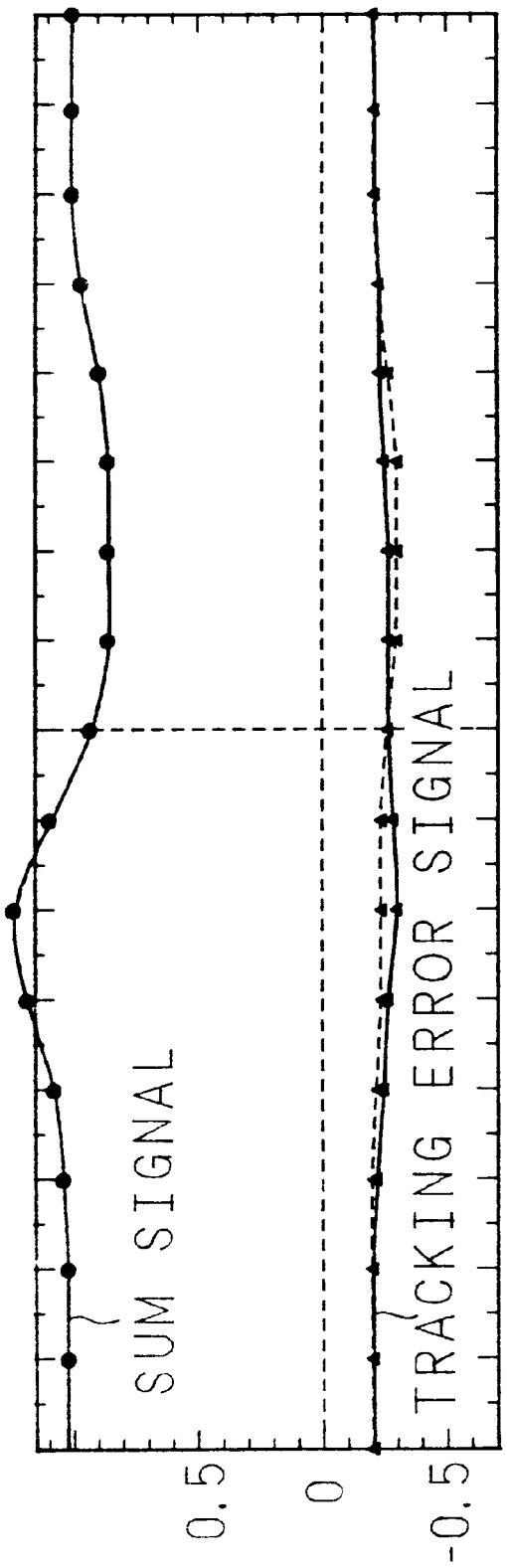
FIG. 18 is a graph showing a tracking error signal by the simulation.

FIGS. 12, 15, and 18 are graphs showing a tracking error signal by the simulation, in which the position in the track direction is plotted in the horizontal axis, and the signal intensity in the vertical axis, and the total received signal (sum signal) and the signal (tracking error signal) balancing the total signal in the right and left portions of the track is shown.

Figure 10:
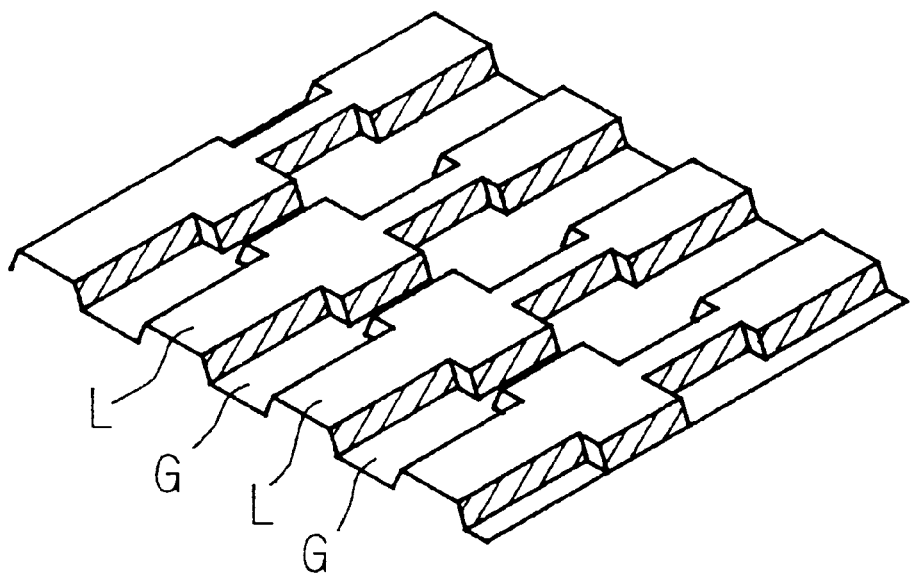
FIG. 10 is an enlarged perspective view of an optical recording medium changed only in track width.
Figure 11A:
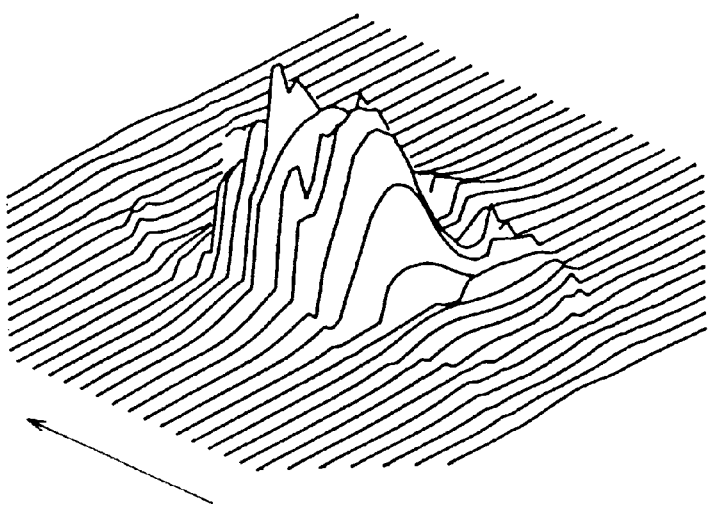
FIG. 11A and 11B are drawings for explaining a tracking error signal by the simulation.
Figure 11B:
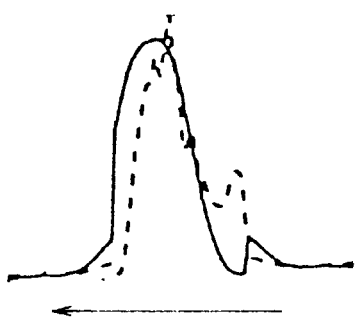

FIG. 12 refers to an optical recording medium changed only in track width as shown in FIG. 10. FIG. 11A is a solid view of the intensity of the tracking error signal of FIG. 12, and FIG. 11B is a central sectional view taken along an arrow in the direction vertical to the track of FIG. 11A.

Figure 13:
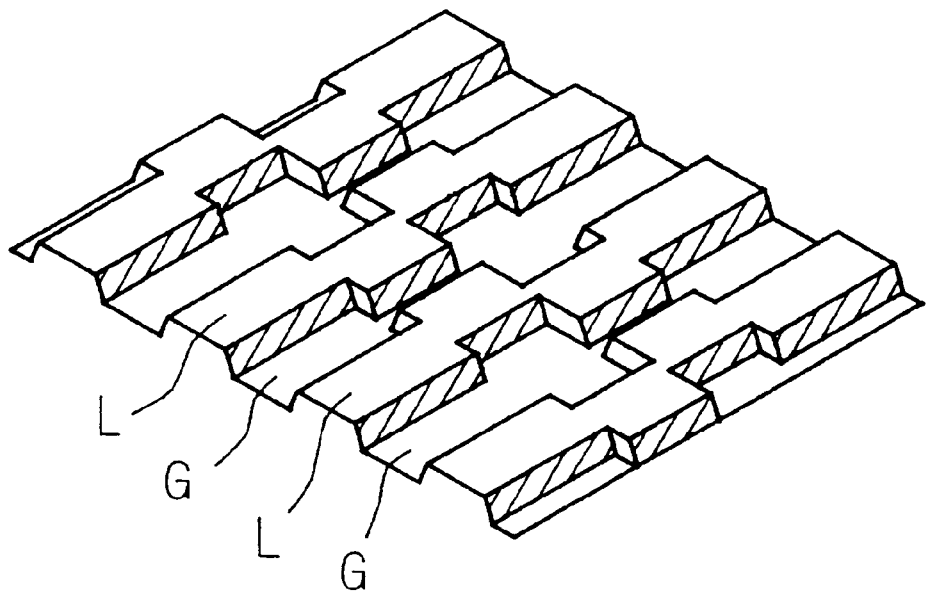
FIG. 13 is an enlarged perspective view of an optical recording medium where the center of the land in the track direction is displaced.
Figure 14A:
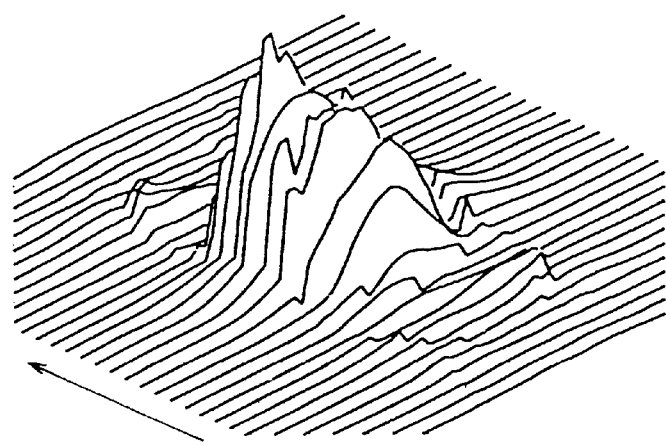
FIG. 14A and 14B are drawings for explaining a tracking error signal by the simulation.
Figure 14B:
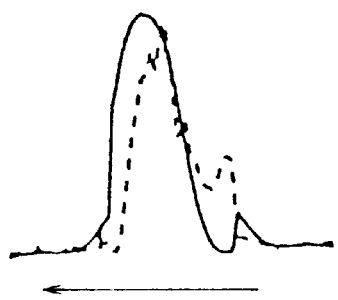

FIG. 15 refers to an optical recording medium changed in spatial frequency by displacing the center of the track and land as shown in FIG. 13. FIG. 14A is a solid view of the intensity of the tracking error signal of FIG. 15, and FIG. 14B is a central sectional view taken along an arrow in the direction vertical to the track of FIG. 14A.

In both FIG. 12 and FIG. 15, when the tilt amount is zero, the light beam passes on the center of the track, and no tracking error signal occurs. Though the tilt amount is not zero, since the spatial frequency in the direction vertical to the track direction is not changed, no change owing to the tilt occurs in the optical recording medium changed only in track width as shown in FIG. 12. In the case of FIG. 15, since the spatial frequency in the direction vertical to the track direction at a portion is changed from the spatial frequency at another portion, the change due to the tilt appears as being enlarged.

Figure 16A:
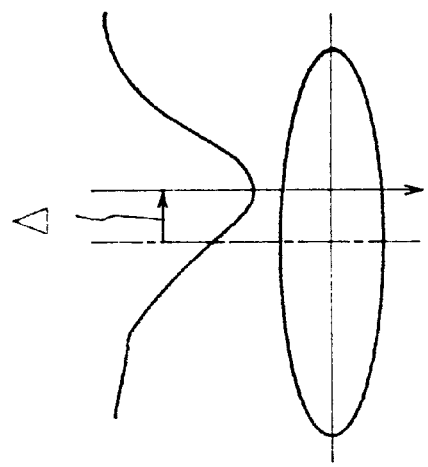
FIG. 16A and 16B are drawings for explaining a tracking error signal by the simulation.
Figure 16B:
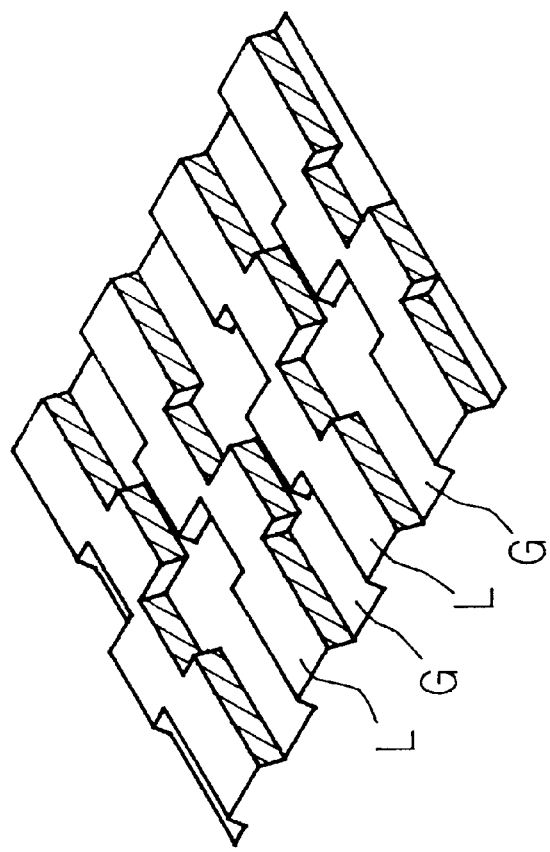
Figure 17A:
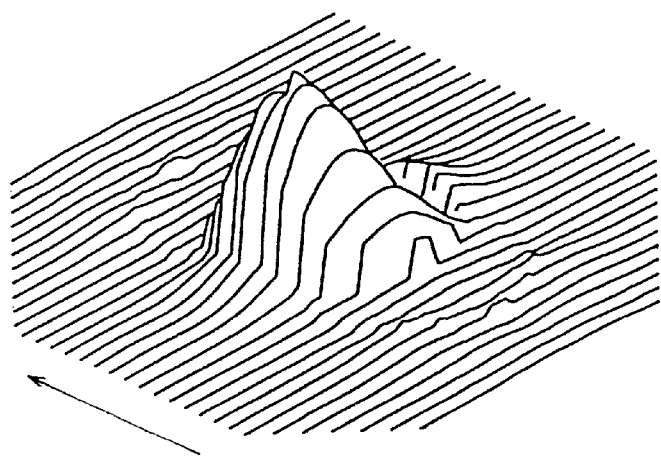
FIG. 17A and 17B are drawings for explaining a tracking error signal by the simulation.
Figure 17B:
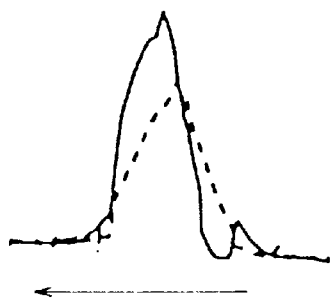

FIG. 18 refers to an optical recording medium changed in spatial frequency, by changing the center of the track and land as shown in FIG. 16B (which is the same as in FIG. 13), and this is a graph showing the tracking error signal by the simulation in the case of imbalanced emission intensity of the light beam as shown in FIG. 16A. FIG. 17A is a solid view of the intensity of the tracking error signal of FIG. 18, and FIG. 17B is a central sectional view taken along an arrow in the direction vertical to the track of FIG. 17A.

In this case, interference of the first-order diffracted light is also changed by imbalance of light beam so that a change occurs, but it is not so large.

Figure 19:
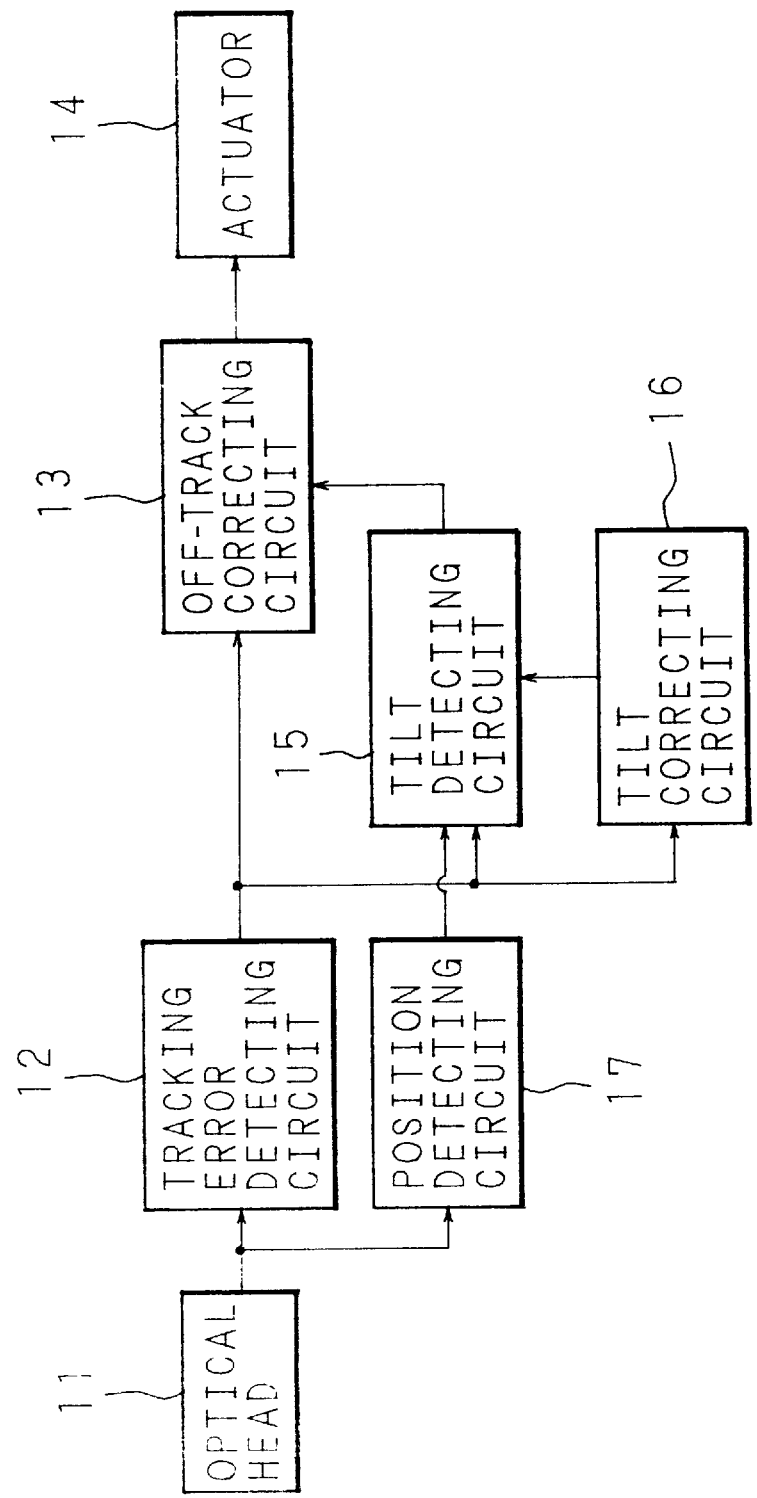
FIG. 19 is a block diagram of an optical disk drive for executing tilt detection and tilt correction of the invention.

FIG. 19 is a block diagram showing a constitution of the embodiment of the optical recording medium, tilt detector, optical disk drive, tilt detecting method, and tilt correcting method of the invention. This optical disk drive comprises a tilt detecting circuit 15 for detecting the tilt amount from the tracking error signal obtained by an optical head 11 and tracking error detecting circuit 12, and a position detecting circuit 17 for detecting the tilt detecting portion from the data signal obtained by the optical head 11, and informing the tilt detecting circuit 15.

This optical disk drive further comprises an off-track correcting circuit 13 (off-track calculating means) for calculating and correcting the off-track amount, corresponding to the tilt amount detected by the tracking error signal and the tilt detecting circuit 15, an actuator 14 for correcting the off-track amount by the correction signal from the off-track correcting circuit 13, and a tilt correcting circuit 16 for correcting the error of the tilt amount detected by the tilt detecting circuit 15, on the basis of the tracking error signal output from the tracking error detecting circuit 12 on a mirror surface.

Figure 20:
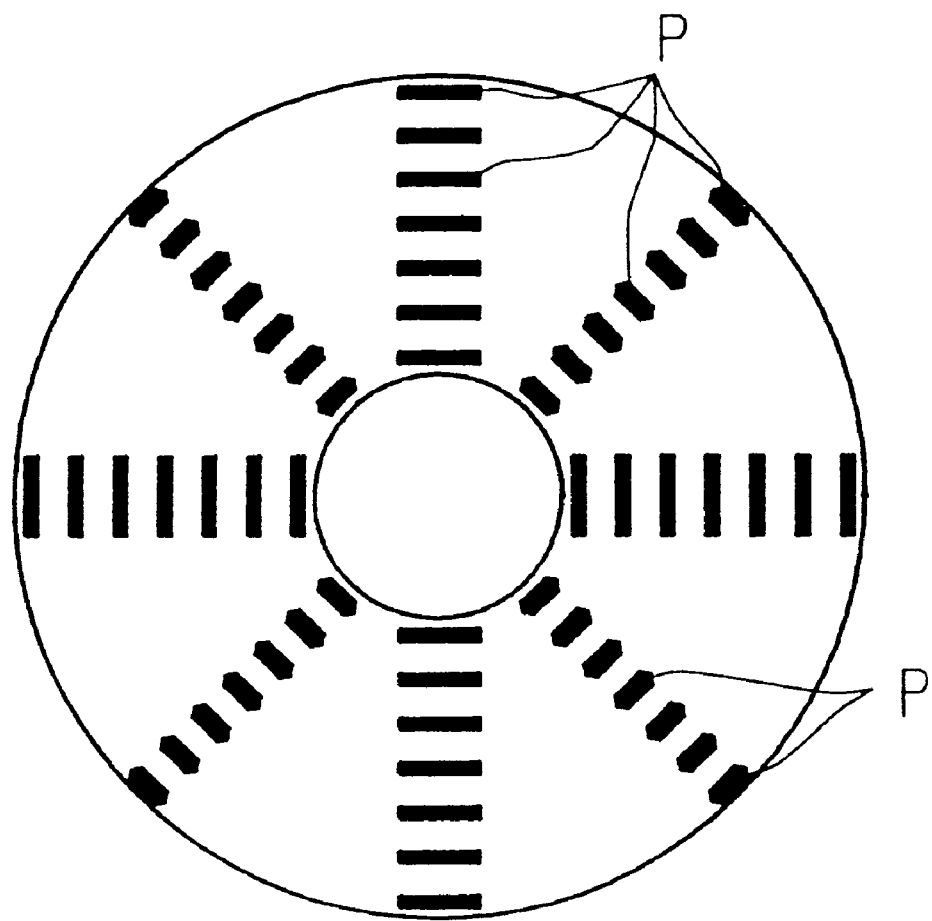
FIG. 20 is a drawing for explaining an example of a tilt detecting part.

In the thus constituted optical disk drive, the tilt detecting circuit 15 detects the tilt amount according to the tracking error signal obtained by the optical head 11 and the tracking error detecting circuit 12, from the optical recording medium, for example, in which the tilt detecting portion P is disposed in each sector as shown in FIG. 20. At this time, the position detecting circuit 17 detects the tilt detecting portion P from the data signal obtained by the optical head 11, and informs the tilt detecting circuit 15. At the tilt detecting portion P the centers of the groove G and land L are displaced only at both sides of the running track as show in FIG. 8, thereby to change the spatial frequency of the running track.

The off-track correcting circuit 13 outputs a correction signal for correcting the off-track amount, corresponding to the tilt amount detected by the tracking error signal and the tilt detecting circuit 15, and the actuator 14 corrects the off-track amount by this correction signal.

On the other hand, the tilt correcting circuit 16, on the mirror surface of the optical recording medium, corrects the error of the tilt amount detected by the tilt detecting circuit 15, on the basis of the tracking error signal output from the tracking error detecting circuit 12.

By correcting the offset amount proportional to the detected tilt amount by force in the off-track correcting circuit 13, the center of the spot intensity is maintained in the track center though the tilt occurs.

In particular, in the MSR (Magnetically-induced Super Resolution) medium, since only a high temperature portion in the central part of the spot is a reproduction window, the track pitch may be made narrower than the spot diameter. If there is a tilt, as in the spot profile shown in FIG. 21 (plotting the position in the direction vertical to the track, with the track center being 0, in the horizontal axis, and the spot intensity in the vertical axis), the spot intensity center slightly deviates (for example, a deviation of 0.0625 $\mu$m occurs by a tilt of 10 mrad), but it was little problem conventionally because the track pitch was broad.

When the track pitch is narrow as the MSR, however, this phenomenon cannot be ignored.

That is, in tracking servo, since the center of the beam spot is positioned in the track center by the tracking error signal, the off-track caused by the tilt, aside from the tilt itself, works to narrow the tolerance of the tilt.

Figure 21:
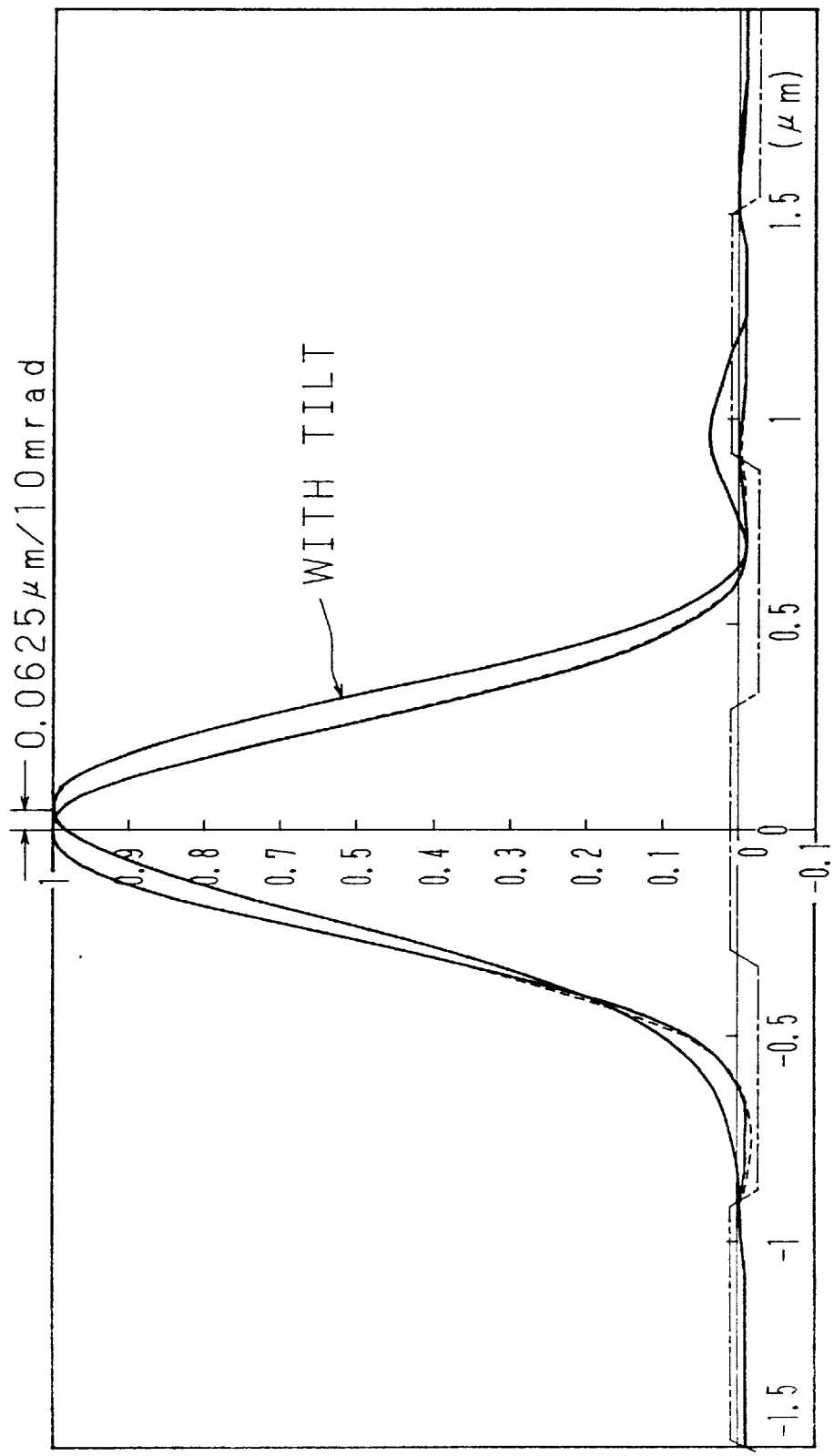
FIG. 21 is a graph showing a spot profile in the presence of a tilt.

Therefore, by correcting the deviation shown in FIG. 21 by the tilt amount detected by the above method (or by other methods), the off-track margin and tilt margin can be expanded.

Conventionally, the tilt detecting mechanism was provided with the tilt correcting mechanism, but in the above method, the tilt amount can be also detected by the push-pull detection system, and the correction is also achieved by giving the off-track (and adjustment of read power), and no exclusive mechanism is necessary, and it is applicable to high speed access.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

We claim:

1. An optical recording medium comprising:
    a plurality of lands which form tracks; and
    a plurality of grooves which form tracks among the lands,
    wherein at least one of said plurality of lands or said plurality of grooves is provided with least one displaced portion in which the center thereof in the track direction is displaced from the center of at least one other portion thereof; and further wherein said at least one displaced portion is configured and arranged for use in detecting an amount of tilt of the optical recording medium.

2. The optical recording medium of claim 1 further comprising:
    a plurality of said displaced portions, wherein at least one of said displaced portions is provided on at least one of said lands; and at least one of said displaced portions is provided on at least one of said grooves.

3. The optical recording medium of claim 1 further comprising at least one change in width, as defined along said track direction, in said at least one land and/or in said at least one groove.

4. The optical recording medium of claim 1 wherein said at least one displaced portion is formed by varying the width of the adjacent land or groove.

5. The optical recording medium of claim 4 further comprising at least two variations in the width of said adjacent land or groove.

6. A tilt detector of an optical recording medium comprising:
    detecting means for detecting a tilt portion configured and arranged for detecting a tilt amount, said tilt portion being located on a track formed on the optical recording medium;

a photo detector halved in the direction vertical to the track direction; and tracking error detecting means for obtaining a tracking error signal from the difference in quantities of light received by each of said halves of said photo detector, whereby the tilt amount of the optical recording medium is detected on the basis of the output of the tracking error detecting means when said detecting means detects the tilt portion.

7. The tilt detector of claim 6, further comprising means for detecting the difference in quantities of light received by each of said halves of said photo detector on a mirror surface for totally reflecting the light, and means for correcting the tilt amount on the basis of said difference.

8. An optical disk drive comprising:

a tilt detector including detecting means for detecting a tilt portion configured and arranged for detecting a tilt amount, said tilt portion being located on a track formed on an optical recording medium, a photo detector halved in the direction vertical to the track direction, and tracking error detecting means for obtaining a tracking error signal from the difference in quantities of light received by each of said halves of said photo detector;

off-track calculating means for calculating an off-track correction amount proportional to the tilt amount detected by said tilt detector; and an actuator for giving an off-track corrected by the correction amount calculated by said off-track calculating means to the optical recording medium, whereby the center of the light beam intensity is maintained in the track center even though the optical recording medium is tilted.

9. The optical disk drive of claim 8 wherein the optical recording medium includes at least one land and at least one groove, and further wherein said tilt portion is defined by at least one variation in the width of at least one of said lands or said grooves.

10. An optical disk drive comprising:

a tilt detector including detecting means for detecting a tilt portion configured and arranged for detecting a tilt amount, said tilt portion being located on a track formed on an optical recording medium, a photo detector halved in the direction vertical to the track direction, tracking error detecting means for obtaining a tracking error signal from the difference in quantities of light received by each of said halves of said photo detector, means for detecting the difference in quantities of light received by said photo detector on a mirror surface for totally reflecting the light, and means for correcting the tilt amount on the basis of said difference;

off-track calculating means for calculating an off-track correction amount proportional to the tilt amount detected by said tilt detector; and an actuator for giving an off-track corrected by the correction amount calculated by said off-track calculating means to the optical recording medium, whereby the center of the light beam intensity is maintained in the track center even though the optical recording medium is tilted.

11. The optical disk drive of claim 10 wherein the optical recording medium includes at least one land and at least one groove, and further wherein said tilt portion is defined by at least one variation in the width of at least one of said lands or said grooves.

12. A tilt detecting method of an optical recording medium comprising the steps of:

detecting a tilt portion of the optical recording medium that is mounted on an optical disk drive with a tilt detector including:

detecting means for detecting said tilt portion, where said detecting means is configured and arranged for detecting a tilt amount, said tilt portion being located on a track formed on the optical recording medium, which includes lands which form tracks and grooves which form tracks among the lands, wherein at least one of said lands and/or said grooves is provided with the tilt amount detecting portion where the center in the track direction is displaced, a photo detector halved in the direction vertical to the track direction, and a tracking error detecting means for obtaining a tracking error signal from the difference in quantities of light received by each of said halves of said photo detector;

detecting the difference in quantities of light received at said tilt amount detecting portion when said tilt portion is detected; and detecting the tilt amount of said optical recording medium on the basis of the detected difference in quantifies of the received light.

13. The tilt detecting method of the optical recording medium of claim 12 further comprising the steps of:

detecting the difference in quantities of light received by each of said halves of said photo detector from a mirror surface for totally reflecting the light, and correcting the tilt amount on the basis of said difference.

14. A tilt correcting method of an optical recording medium comprising the steps of:

detecting a tilt portion of the optical recording medium that is mounted on an optical disk drive with a tilt detector including:

detecting means for detecting said tilt portion, where said detecting means is configured and arranged for detecting a tilt amount, said tilt portion being located on a track formed on the optical recording medium, which includes lands which form tracks and grooves which form tracks among the lands, wherein at least one of a said lands and/or said grooves is provided with the tilt amount detecting portion where the center in the track directions is displaced, a photo detector halved in the direction vertical to the track direction, and a tracking error detecting means for obtaining a tracking error signal from the difference in quantities of light received by each of said halves of said photo detector;

detecting the difference in quantities of light received at said tilt amount detecting portion when said tilt portion is detected; and detecting the tilt amount of said optical recording medium on the basis of the detected difference in quantities of the received light, maintaining the center of the light beam intensity in the track center by giving an off-track signal proportional to the detected tilt amount of the optical recording medium.

15. A tilt correcting method of an optical recording medium comprising the steps of:

detecting a tilt portion of the optical recording medium that is mounted on an optical disk drive with a tilt detector including:

detecting means for detecting said tilt portion, where said detecting means is configured and arranged for detecting a tilt amount, said tilt portion being located on a track formed on the optical recording medium, which includes lands which form tracks and grooves which form tracks among the lands, wherein at least one of said lands and/or said grooves is provided with the tilt amount detecting portion where the center in the track direction is displaced, a photo detector halved in the direction vertical to the track direction, and a tracking error detecting means for obtaining a tracking error signal from the difference in quantities of light received by each of said halves of said photo detector;

detecting the difference in quantities of light received at said tilt amount detecting portion when said tilt portion is detected;

detecting the tilt amount of said optical recording medium on the basis of the detected difference in quantities of the received light;

detecting the difference in quantities of light received by each of said halves of said photo detector from a mirror surface for totally reflecting the light, and correcting the tilt amount on the basis of said difference; and maintaining the center of the light beam intensity in the track center by giving an off-track signal proportional to the detected tilt amount of the optical recording medium.

\* \* \* \* \*

UNITED STATES PATENT AND TRADEMARK OFFICE
CERTIFICATE OF CORRECTION

PATENT NO. : 5,978,332
DATED : November 2, 1999
INVENTOR(S) : Itakura et al.

It is certified that error appears in the above-indentified patent and that said Letters Patent is hereby corrected as shown below:

Claim 1, line 5, before "least" insert --at--

Signed and Sealed this

Tenth Day of April, 2001

*Attest:*

NICHOLAS P. GODICI

*Attesting Officer*  *Acting Director of the United States Patent and Trademark Office*